United States Patent Office 2,732,509
Patented Jan. 24, 1956

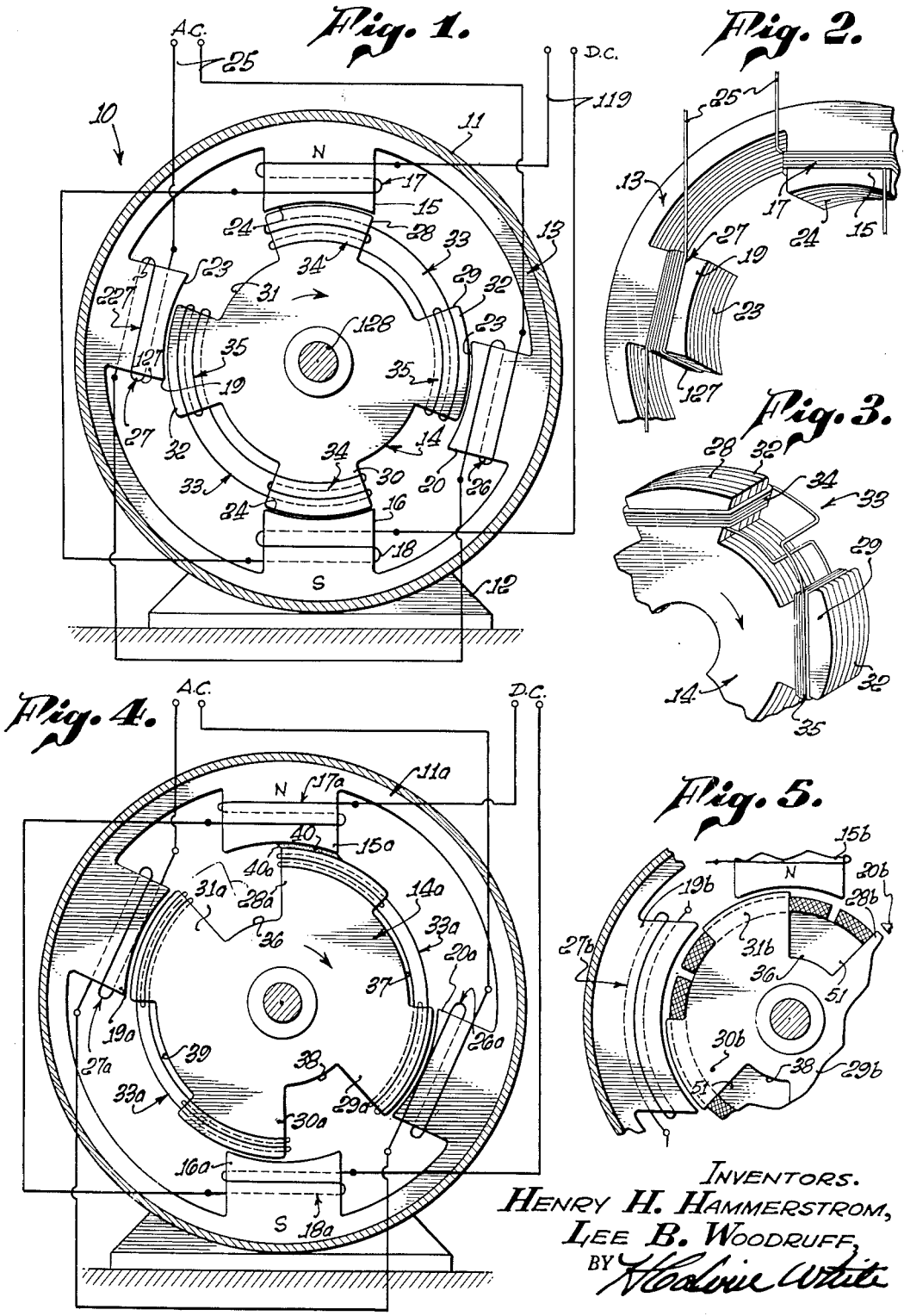

2,732,509

ALTERNATING CURRENT DYNAMO-ELECTRIC MACHINE

Henry H. Hammerstrom and Lee B. Woodruff, Los Angeles, Calif.

Application November 13, 1952, Serial No. 320,252

14 Claims. (Cl. 310—168)

This invention relates to improved dynamoelectric machines, such as generators and motors. The present application comprises a continuation-in-part of our copending applications Serial Number 221,884, filed April 19, 1951, on Brushless Dynamoelectric Machines, and Serial Number 254,772, filed November 3, 1951, on "No Brush Dynamoelectric Machine Structure," both now abandoned.

In certain broad respects, a machine embodying the invention may be considered as comprising a pair of relatively movable sections, usually a rotor and a stator, a magnetic exciter pole carried by one of the sections, means energized by the exciter pole to set up in the second section a second and relatively moving magnetic pole, and a main armature winding carried by the first section and positioned to coact with the pole of the second section to convert mechanical to electrical energy, or vice versa. When the device is used as a generator, the relative movement of the magnetic field generates in the winding an electromotive force and a resultant output current. Conversely, when the device is used as a motor, a current supplied to the same winding from an external source coacts with the field to cause relative movement of the sections. Preferably, of course, the main field pole and the main armature winding are carried by the stator, so that there is no necessity for any direct brush type connection to the rotor.

The magnetic polarity in the second section or rotor is preferably created by first generating a current in a winding carried by the rotor, and then using that current to electrically energize the desired rotor pole. More specifically, the rotor may be provided with one or more endless or closed windings, each having a first portion moving across the stator pole field to generate the rotor current, and a second portion forming a coil utilizing that current to magnetize an outer portion of the rotor. Preferably, each endless rotor winding forms two proximately positioned but circularly offset loops.

Under certain circumstances, we find it highly desirable to form some of the windings, and particularly those on the rotor, as what we call figure 8 windings. By this term we mean an endless winding forming a pair of circularly offset loops interconnected in series and reversely, so that a common current flowing through the winding flows about the loops in reverse directions.

As a rotor winding passes across the field of a stator pole, an electromotive force is immediately generated in the winding, but a current does not flow in the winding until the expiration of a short delay period caused by the reactance of the rotor circuit. To compensate for this delay, a particular feature of the invention involves the positioning of the stator winding in a circularly advanced position, such as to be located opposite the rotor pole at the exact moment that current is flowing in the rotor winding.

The rotor and stator may be so constructed that each stator winding is alternately associated with the two stator poles at its opposite sides. That is, the winding is first subjected to a rotor field created by current generated in passing a first one of those poles, and then coacts with a field created by passage across the other pole. As will appear, this dual association may be achieved by forming the rotor winding to have a pair of loops circularly spaced one half the distance between successive stator poles.

To assure most effective generation of the rotor currents, we prefer to specially form the magnetic metal of the rotor in a manner effectively controlling the rates of relative movement, as the rotor turns, between the stator field or fields and the rotor winding or windings. In particular, as the rotor turns, the field of each stator exciter pole may be caused to alternately advance circularly a predetermined distance with the rotor, then abruptly jump rearwardly along the surface of the rotor, then advance again with the rotor, etc. By locating certain portions of each rotor winding near, and preferably right at the locations of abrupt field movement, the conductors may be caused to develop sudden high voltages which produce sudden surges of rotor polarizing current in the winding.

These abrupt field movements may be caused by forming the magnetic metal of the rotor to present alternate projections or poles and intermediate cutaway portions, successively movable past the stator exciter poles as the rotor turns. Some of the cutaway portions extend sufficiently deeply into the rotor that, as a cutaway moves to a position opposite the pole, the major portion of the field of that pole, and preferably substantially the entire field, continues to flow to or from a projection at the leading side of the cutaway, causing advancement of a rear edge of the field with the rotor, until the rotor reaches a predetermined position at which the field suddenly and abruptly jumps rearwardly across the rotor cutaway to a projection at its rear side. Best operating characteristics are attained when these deep rotor cutaways extend into the rotor a distance equalling at least about one third the radius of the outermost or pole portions of the rotor. Preferably the rotor cutaways or recesses are of a circular extent corresponding approximately to the stator exciter poles, so that just as a rotor projection leading the recess moves away from a stator pole, the next successive projection, to the rear of the recess, reaches the stator pole, causing the desired rearward jump of its field.

When the rotor windings each comprise a pair of circularly offset loops connected in series, as previously discussed, the two loops may be wound about a pair of circularly spaced projections or poles on the rotor, and have transverse portions received in transverse recesses adjacent and between the poles. A deep recess of the type previously discussed is preferably formed at the side of each pole which faces away from the associated pole while a less deep recess is provided between the two poles. To assure most effective functioning of the device, it has been found that the deeper recesses should be at least about three times as deep as the intermediate recess.

A further feature of the invention involves an arrangement in which the stator armature winding is so formed and positioned as to function properly when the rotor is turning in either rotative direction. For this purpose, this winding (or a functionally equivalent plurality of windings) may be positioned substantially midway between a pair of the stator exciter poles, and be of a circular extent approximately double that of each stator pole.

The above and other features and objects of the present invention will be better understood from the following detailed description of the typical embodiments illustrated in the accompanying drawing, in which:

Fig. 1 is a side view of an alternating current dynamo-electric machine embodying the invention and capable of use as either a motor or generator, the outer housing of the device being broken away to reveal the inner parts;

Fig. 2 is a fragmentary perspective view of the Fig. 1 stator;

Fig. 3 is a fragmentary perspective view of the Fig. 1 rotor;

Fig. 4 is a side view of a variational form of dynamo-electric machine embodying the invention; and Fig. 5 is a fragmentary side view of a third embodiment of the invention.

Referring first to Fig. 1, the alternating current device 10 there shown is contained within the usual generally cylindrical outer housing or body 11 having a mounting or base portion 12. Housing 11 carries an essentially annular stator 13, within which rotor 14 is rotatably mounted. As seen in Figs. 2 and 3, both the stator and rotor are preferably formed of a number of relatively thin sheet iron laminations tightly fastened together in any suitable manner.

At diametrically opposite locations, stator 13 forms a pair of inwardly projecting magnetic poles 15 and 16, about which are wound wire exciter coils 17 and 18. Coils 17 and 18 are connected in series and reversely to direct current supply lines 119, to electrically set up unlike polarities at the inner ends of poles 15 and 16. For instance, pole 15 may typically be considered as a north pole and pole 16 as a south pole.

At diametrically opposite locations circularly between poles 15 and 16, stator 13 has a pair of inwardly projecting portions or poles 19 and 20. The inner faces 23 of these stator portions 19 and 20, and the inner faces 24 of poles 15 and 16 are curved as shown and lie in a common cylindrical plane centered about the rotor axis. The circular extent of faces 23 on stator portions 19 and 20 are substantially equal to the circular extent of the exciter pole faces 24. As best seen in Fig. 2, a pair of coils 26 and 27, each comprising several turns of wire, are wound about the stator poles 19 and 20 respectively. These coils are connected in series to external leads 25 with the two coils being interconnected reversely so that a common current flowing through the coils flows in one circular direction about stator portion 19 and in a reverse circular direction about stator portion 20, both as seen when looking radially outwardly toward the coils.

The rotor 14 is rigidly carried by and rotatable with a mounting shaft 128, which extends through a central opening in the rotor, and is journaled at each end in the usual bearings (not shown). The rotor is shaped to present four poles 28, 29, 30 and 31, preferably approximately evenly circularly spaced, and between which are formed four wire-receiving recesses. The outer faces 32 of the rotor poles are desirably of a circular extent corresponding substantially to that of stator poles 15, 16, 19 and 20, and may be curved to be in a common cylindrical plane spaced a short gap distance from the stator poles faces. The rotor carries, about its poles 28, 29, 30 and 31, a pair of closed or endless rotor windings 33, each of the windings 33 extending about two of the rotor poles.

Each rotor winding 33 comprises essentially a pair of coils 34 and 35 interconnected in series and extending respectively about a pair of adjacent rotor poles. More particularly, as best seen in Fig. 3, the wire forming one of the windings 33 extends about pole 28 several times to form the multi-turn coil 34, after which the wire extends about pole 29 several times to form the second multi-turn coil 35. The two ends of one coil are connected to the two ends of the other coil, so that the coils together form an endless winding. The coils are preferably connected reversely to form what we term a figure 8 winding, i. e. a winding in which a common current flowing through both coils of one of the windings 33 flows in one direction about one coil and in a reverse direction about the other coil. The circular distance between the centers of the two interconnected coils 34 and 35 of each winding 33 is desirably half the circular distance between successive exciter poles of the stator. Since we have typically represented a two pole machine, in which poles 15 and 16 are spaced 180 degrees apart, the centers of the two associated rotor coils 34 and 35 should be half that distance or 90 degrees apart.

While it will be understood that the various rotor and stator windings may be formed of different sizes of wire and different numbers of turns for devices of varying sizes, we give the following as an example of typical winding data for a machine in which the maximum rotor diameter is about 2⅝", the stator diameter is about 4⅝" and the axial length of these parts is about 1⅛".

(1) Stator exciter windings—400 turns each of No. 20 B & S copper wire.

(2) Stator windings 26 and 27—40 turns each of No. 15 B & S copper wire.

(3) Rotor coils 34 and 35—40 turns each of No. 20 B & S copper wire.

When the device of Figs. 1 to 3 is to be used as an alternator, a direct current exciting voltage is connected to leads 19, and the rotor is then mechanically driven in a clockwise direction to produce an alternating current output in leads 25. During such operation as an alternator, the transversely extending portions of rotor windings 33 cross the fields of poles 15 and 16 in a manner generating current in those windings, which current is used to set up magnetic poles in the rotor, which are then moved past stator windings 26 and 27 to generate in them the output current. More specifically, assume first the condition in which those portions of a rotor coil 35 which extend transversely across the leading side of a rotor pole 29 are passing beneath stator pole 15. As these portions of the rotor winding cross the field of the pole 15, an electromotive force is generated in the coil 35, and the windings 33 of which the coil is a part. After a short delay period occasioned by the reactance of the circuit, the generated electromotive force causes a current to flow in the winding 33. Since this winding extends about one of the rotor poles 28, one result of that generated current is to set up a magnetic polarity in that rotor pole. At the instant that rotor pole 28 thus becomes magnetized, its leading edge reaches the location of the first transverse portions 127 of one of the stator output windings 27. As will be understood, the movement of the field associated with rotor pole 28 across these portions of the winding 27 generates an electromotive force and current in that winding and therefore in a load circuit connected to leads 25.

After the conductors extending across the leading side of pole 29 have passed across the underside of stator pole 15, the portions of coil 35 which extend transversely across the trailing side of pole 29 commence to cross under pole 15, with the resultant generation of a second and reversed electromotive force within winding 33. Following the delay period resulting from the rotor circuit reactance, a second and reverse current is set up in winding 33, which causes a polarity of rotor portion 28 the reverse of that previously created. At the instant that this second reverse polarity is created in rotor pole 28, that pole commences to pass over the second transverse portions 227 of output winding 27. Such movement of this reversed magnetic field across those second transverse portions of winding 27 generates an electromotive force and current in winding 27 in the same direction as that previously generated by passage of rotor pole 28 across the first portions of the winding.

The above discussion brings out the manner in which movement of a rotor coil 35 past stator exciter pole 15 generates a current in the rotor winding acting to create magnetic polarities in rotor pole 28, which then moves past stator output coil 27, to produce an output current in it. A similar but essentially reversed effect results when the second coil 34 of a rotor winding 33 passes beneath the exciter pole 15. Specifically as the leading transverse portions of a coil 34 (i. e. the portions extending across the leading side of pole 28) pass pole 15, an electromotive force and delayed current are generated in winding 33, one of whose results is the creation of a magnetic polarity in rotor pole 29, about which coil 35 of the winding extends. When the transverse portions of coil 34 at the trailing side of pole 28 then pass over pole 15, a reverse current is generated in the winding and a reverse polarity is set up in rotor pole 29. When of its first polarity, rotor pole 29 passes the first transverse portions of stator output coil 26, and when of its second polarity this rotor pole passes over the second transverse portions of coil 26, both resulting in the generation of an output current the reverse of that created by passage of coil 35 beneath pole 15.

As each of the rotor windings 33 passes the second exciter pole 16, it acts to generate rotor polarities and stator output currents in the same manner as described above in connection with pole 15. The generated voltages and currents in output coils 26 and 27 are the reverse of those developed by movement past pole 15, but the reverse connection of coils 26 and 27 causes the output current at a particular instant to be additive. As will be understood, the overall result upon rotating rotor 14 is the generation of an alternating currents output voltage in output leads 25.

It is noted that, whereas the centers of adjacent rotor poles are spaced 90 degrees apart, the stator output poles 19 and 20, and their coils, are not spaced a corresponding 90 degrees from the adjacent field poles 15 and 16. Rather, poles 19 and 20 and their coils are advanced in the direction of rotor rotation to a location beyond the midway points between stator poles 15 and 16. Such advancement of the stator output windings 26 and 27 is just sufficient to compensate for the reactance of the rotor winding circuit, which of course causes a delay in the building up of current in the stator winding after the generation of an electromotive force in the winding. Thus, each of the rotor poles 28 and 29 commences to cross the location of the stator windings 26 at the exact moment when the desired current begins to flow in the rotor winding and to generate a desired magnetic polarity in the rotor.

When the device of Figs. 1 to 3 is to be used as a motor, leads 19 are connected to an alternating current exciting voltage, and leads 25 are connected to the same A. C. voltage. Preferably, the power connections are made in a manner such that current flows through windings 17 and 26 in relatively reverse directions and through windings 18 and 27 in reverse directions, all as seen when looking at the coils in a common radial direction. As will be understood, movement of the rotor windings past exciter poles 15 and 16 generates currents in the rotor windings, which set up magnetic polarities in the rotor poles. These rotor poles then react with the current in stator windings 26 and 27 to effect rotation of the rotor. It has been found that a motor so constructed and energized operates at synchronous speed, being locked in step with the alternations in direction of the power supply.

The Fig. 4 form of the invention is basically the same as that of Fig. 1, including a stator 11a, having exciter poles 15a and 16a, and a pair of intermediate poles 19a and 20a. The exciter poles are energized by reversely connected windings 17a and 18a, while a second pair of reversely connected windings 26a and 27a extend about the intermediate poles 20a and 19a respectively. Rotor 14a of the Fig. 4 device has four approximately evenly circularly spaced poles or outwardly projecting portions 28a, 29a, 30a and 31a, with the two "figure 8" windings 33a being carried about the rotor poles in the same manner as in Fig. 1.

A highly important feature of the Fig. 4 form of the invention resides in the special dimensioning of the interpole recesses or cutaways 36, 37, 38 and 39 of the rotor in a manner assuring an output current having most desirable characteristics. For one thing, it is desirable that one or more of these recesses, preferably the two recesses 36 and 38 in which the leading and trailing portions of windings 33a are received, extend sufficiently deeply into the rotor to cause the relative movements between the stator exciter pole fields and the rotor, as the rotor turns, to be intermittent and abrupt rather than regular. More specifically, the depth of these recesses is such that, as one of the recesses moves to a position partially opposite one of the stator exciter poles, the major portion and preferably substantially all of the field 40 of that pole continues to flow to or from the rotor pole portion 28a or 30a which leads the cutaway, after which the field abruptly jumps rearwardly across the cutaway to the trailing pole portion 31a or 29a. Stated differently, the field has a sharply defined circularly rear edge 40a, which advances across the face of the stator pole with the trailing edge of rotor pole 28a or 30a, until the point is reached at which the entire field jumps rearwardly across the cutaway. As will be appreciated, the rearward jump of the field occurs at approximately the broken-line position of Fig. 4, that is as the trailing edges of poles 28a and 30a start to move away from the stator pole, and as the leading edges of poles 29a and 31a reach the stator pole.

With further regard to the depth of recesses 36 and 38, it is noted that these recesses are preferably sufficiently deep that the major portion of the stator field flowing to the rotor poles 28a, 29a and 31a is not able at any time to reach and move circularly along the deepest portions of recesses 36 and 38. Rather, the major portion of this field is actually interrupted at one side of each recess and before reaching the innermost extent thereof and is then set up again at the opposite side of the recess. Structurally, it is desirable that the recesses 36 and 38 extend radially into the rotor a distance equal to ⅓ or more, and preferably about ½, of the radius of the rotor pole faces 32a. Also, the recesses 36 and 38 should be substantially deeper than, and preferably at least three times as deep as, the recesses 37 and 39 in which the circularly intermediate portions of windings 33a are received.

As a stator pole field moves abruptly across one of the deep recesses or cutaways 36 or 38, it crosses the portions of the rotor windings within that recess very rapidly, to thus generate a sudden high voltage E. M. F. in the windings. This effect has proven in practice to result in much more efficient operation of the device than where no deep recesses are provided. Also, it has been discovered that the formation of recesses 36 and 38 to be deeper than recesses 37 and 39 increases the efficiency of the device, and where the device is to be used as an alternator, causes the output current to be considerably more evenly balanced as between its reverse direction components than where all of the recesses are of the same depth.

With regard to certain specific structural details of the Fig. 4 device, it is noted first of all that recesses 36, 37, 38 and 39 should of course extend entirely across the transverse extent of the rotor. Each of these recesses is desirably defined along its sides by a pair of surfaces extending directly radially and transversely of the rotor. The innermost extent of each of the recesses is preferably defined by a cylindrical surface centered about the rotor axis. All of the rotor poles and recesses, as well as the stator poles 15a, 16a, 19a and 20a may be of approximately the same circular extent, that extent being about 45 circular degrees where two exciter poles are employed. In this connection, it has been found desirable in certain instances to form the recesses 36 and 38 of slightly less than 45 degree extent (typically about 1 or 2 degrees), and to form the recesses 37 and 39 slightly greater than 45 degrees (typically about 1 or 2 degrees greater), with the rotor poles preferably being substantially exactly 45 degrees. These variations in dimensions have the effect of regularizing the alternations in the generator output.

Fig. 5 represents fragmentarily a further variational form of the invention, which is constructed in every respect the same as that of Fig. 4, except that the two stator poles 19b and 20b are located midway between exciter poles 15b and 16b, and have a circular extent twice as great as the exciter poles, the rotor poles 28b, 29b, 30b and 31b, and the intermediate rotor recesses. That is, where the device has two exciter poles, and those exciter poles and the rotor poles and recesses are approximately 45 degrees in circular extent, the faces of the intermediate stator poles 19b and 20b preferably have a circular extent of 90°. The windings 26b and 27b about stator poles 19b and 20b then also have circular extents which are twice as great as in Fig. 4. The Fig. 5 device functions in basically the same manner as the previous forms of the invention, but has the advantage for certain uses of being capable of operating efficiently when rotating in either direction.

It is specifically noted that the showings of the windings in Figs. 1 and 4 are diagrammatic in order to best indicate the winding directions and manner of interconnection. With reference to the rotor windings, it is pointed out that whereas these windings are shown diagrammatically as comprising only a few turns all located directly adjacent the rotor poles, these windings may in fact be of a large number of turns and substantially fill the entire circular extents of the rotor recesses. Such a many turn arrangement is shown in Fig. 5, in which the inner portions of deep recesses 36 and 38 are filled with non-magnetic filler elements 51, typically formed of wood or the like, which serve to aid in the positioning of the windings in those recesses.

We claim:

1. A dynamoelectric machine comprising a pair of relatively rotating sections, means forming a plurality of magnetic poles on a first of said sections, electrical winding means on the second section including a conductor moving relative to the first section across the field of a first one of said poles to generate an electric current, said winding means having a portion energized by said generated current and adapted when thus energized to set up a magnetic pole in a predetermined portion of the second section, and an electrically conductive winding carried by the first section in addition to said means forming said poles thereon and having a portion positioned to be essentially opposite said pole in the second section when that pole is energized by said generated current and to be crossed by the field of said pole in the second section as a result of the relative rotation of said sections, and to thereby effect a conversion of energy between the mechanical energy of relative movement of said sections and electrical energy of current flowing in said last mentioned winding.

2. A dynamoelectric machine as recited in claim 1, in which said winding means on the second section comprise an endless electrically conductive winding forming a pair of circularly offset radially outwardly facing loops interconnected in series.

3. A dynamoelectric machine as recited in claim 2, in which a second of said poles on said first section is offset circularly from said first pole thereon, said winding on the first section being disposed about said second pole thereof.

4. A dynamoelectric machine as recited in claim 1, in which said portion of said winding on the first section is circularly advanced farther with respect to said first pole on the first section than said pole on the second section is advanced with respect to said conductor on the second section to compensate for the reactance delay in building up said generated current.

5. An electric generator comprising a stator having a plurality of magnetic poles, a magnetic metal rotor, electrical winding means on the rotor moving relative to the stator across the field of a first one of said poles to generate an electric current, said winding means having a portion energized by said generated current and adapted when thus energized to set up a magnetic pole in the rotor, and an output winding to be connected to a load circuit, said output winding being carried by the stator at a location to be essentially opposite said rotor pole when it is energized by said generated current, and to be crossed by the magnetic field moving with said rotor pole so that electricity is generated in the output winding.

6. An electric generator as recited in claim 5, in which said winding means on the rotor comprise an endless electrically conductive winding forming a pair of circularly offset loops interconnected in series and reversely.

7. An electric generator as recited in claim 5, in which said rotor has a plurality of circularly spaced outwardly projecting portions passing in close proximity to the stator poles, and has portions cut away inwardly and extending transversely across the rotor at locations intermediate said projecting portions, said winding means on the rotor comprising an endless conductive winding forming a pair of loops disposed about two of said projecting portions of the rotor respectively, said rotor winding extending across the rotor within said cutaway portions thereof, one of said cutaway portions of the rotor containing said winding being cut away radially inwardly beyond the outer extremities of said projecting rotor portions a distance equalling at least about one-third of the radius of said outer extremities.

8. An electric generator as recited in claim 5, in which said rotor has a plurality of circularly spaced outwardly projecting portions passing in close proximity to the stator poles, and has portions cut away inwardly and extending transversely across the rotor at locations intermediate said projecting portions, said winding means on the rotor comprising an endless conductive winding forming a pair of loops disposed about two of said projecting portions of the rotor respectively, said rotor winding extending across the rotor within said cutaway portions thereof, said rotor body being cut away to a substantially greater depth at the side of each of said two projecting portions of the rotor which faces circularly away from the other of the two projections than at the location circularly between said two projections.

9. An electric generator as recited in claim 8, in which said cutaway portions of the rotor have circular extents approximately equal to the circular extent of said first stator pole.

10. An electric generator as recited in claim 5, in which a second one of said stator poles is offset circularly from said first pole, and said output winding is disposed about said second stator pole.

11. An electric generator as recited in claim 10, in which said rotor has a pair of circularly spaced poles, and said rotor winding means comprise an endless conductive winding forming two loops disposed about said two rotor poles respectively, said second stator pole being advanced circularly with respect to said first stator pole a greater circular distance than one of the rotor poles is advanced with respect to the other to thereby compensate for the reactance delay in building up said generated rotor current.

12. An electric generator as recited in claim 11, in which said two loops of the rotor winding are interconnected reversely, said rotor having a transversely extending inwardly cutaway portion between said two rotor poles, and having a pair of deeper transverse cutaway portions adjacent said two rotor poles respectively and located at the side thereof which face circularly away from each other, said deeper cutaway portions extending into the rotor to a depth equal to at least about one-third of the radius of the rotor poles, said rotor winding being received in said three cutaway portions of the rotor, said rotor poles and all three of said cutaway portions of the rotor having circular extents approximately equal to the circular extent of said first stator pole.

13. An electric generator comprising a stator having a plurality of circularly spaced magnetic exciter poles and having a plurality of output poles circularly therebetween, a rotor having a pair of circularly spaced poles movable past said stator poles, an endless electrically conductive winding on said rotor forming two loops each disposed about only one of said rotor poles and interconnected in series and reversely, said winding being positioned to generator current therein as it passes said exciter poles and being adapted to set up magnetic polarities in said rotor poles as a result of said generated current, and output windings to be connected to a load circuit and extending about said output poles at positions to be essentially opposite said rotor poles when the latter are energized by said generated current, and to be crossed by the fields moving with said rotor poles to thereby generate electricity in said output windings.

14. An electric generator as recited in claim 13, in which said output poles have circular extents approximately twice as great as said exciter poles and said rotor poles.

References Cited in the file of this patent
UNITED STATES PATENTS

| | | |
|---|---|---|
| 1,773,094 | Borreson | Aug. 12, 1930 |
| 1,880,388 | Guerin | Oct. 4, 1932 |
| 2,020,591 | Temple | Nov. 12, 1935 |